United States Patent
Morris-Cohen et al.

(10) Patent No.: US 10,418,647 B2
(45) Date of Patent: Sep. 17, 2019

(54) MITIGATION OF PARASITIC REACTIONS WITHIN FLOW BATTERIES (71) Applicant: Lockheed Martin Energy, LLC, Bethesda, MD (US)

(72) Inventors: Adam Morris-Cohen, Maynard, MA (US); Srivatsava Puranam, Cambridge, MA (US); John Goeltz, Carmel, CA (US); Arthur J. Esswein, San Francisco, CA (US)

(73) Assignee: Lockheed Martin Energy, LLC, Bethesda, MD (US)

( * ) Notice: Subject to any disclaimer, the term of this patent is extended or adjusted under 35 U.S.C. 154(b) by 417 days.

(21) Appl. No.: 15/090,506

(22) Filed: Apr. 4, 2016

(65) Prior Publication Data

US 2016/0308224 A1    Oct. 20, 2016

Related U.S. Application Data (60) Provisional application No. 62/147,702, filed on Apr. 15, 2015.

(51) Int. Cl.
*H01M 8/0258* (2016.01)
*H01M 8/18* (2006.01)
(Continued)

(52) U.S. Cl.
CPC .......... *H01M 8/0258* (2013.01); *H01M 4/96* (2013.01); *H01M 8/0228* (2013.01); *H01M 8/188* (2013.01); *Y02E 60/528* (2013.01)

(58) Field of Classification Search
CPC ... H01M 8/0258; H01M 8/0228; H01M 8/188
See application file for complete search history.

(56) References Cited

U.S. PATENT DOCUMENTS 3,779,813 A    12/1973    Rabut
4,075,401 A    2/1978    Miyagawa
(Continued)

FOREIGN PATENT DOCUMENTS

CN    103187551 A    7/2013
DE    10-2011-120802 A1    6/2013
(Continued)

OTHER PUBLICATIONS

R.K. Sen, et al., "Metal-Air Battery Assessment," U.S. Department of Energy Report for Contract DE-AC06-76RLO1830, May 1988, 84 pages.
(Continued)

*Primary Examiner* — Olatunji A Godo
(74) *Attorney, Agent, or Firm* — BakerHostetler LLP (57) ABSTRACT Productive electrochemical reactions can often occur most effectively in proximity to a separator dividing an electrochemical cell into two half-cells. Parasitic reactions can often occur at locations more removed from the separator. Parasitic reactions are generally undesirable in flow batteries and other electrochemical systems, since they can impact operating performance. Flow batteries having a decreased incidence of parasitic reactions can include, a first half-cell containing a first electrode, a second half-cell containing a second electrode, a separator disposed between the first half-cell and the second half-cell and contacting the first and second electrodes, a first bipolar plate contacting the first electrode, and a second bipolar plate contacting the second electrode, where a portion of the first electrode or the first bipolar plate contains a dielectric material. The first electrode and the first bipolar plate still define a contiguous electrically conductive pathway when containing the dielectric material.

21 Claims, 4 Drawing Sheets (51) Int. Cl.
  *H01M 4/96*    (2006.01)
  *H01M 8/0228*  (2016.01)

(56) References Cited

U.S. PATENT DOCUMENTS

| | | | |
|---|---|---|---|
| 4,532,193 | A | 7/1985 | Kniazzeh et al. |
| 4,735,872 | A | 4/1988 | Maimoni |
| 4,902,589 | A | 2/1990 | Dahn et al. |
| 4,948,681 | A | 8/1990 | Zagrodnik et al. |
| 5,188,911 | A | 2/1993 | Downing et al. |
| 5,618,641 | A | 4/1997 | Arias |
| 5,637,416 | A | 6/1997 | Yoshii et al. |
| 5,665,212 | A | 9/1997 | Zhong et al. |
| 6,296,746 | B1 | 10/2001 | Broman et al. |
| 6,740,444 | B2 | 5/2004 | Leban |
| 7,229,564 | B2 | 6/2007 | Liu et al. |
| 8,268,475 | B2 | 9/2012 | Tucholski |
| 8,268,511 | B2 | 9/2012 | Mekala et al. |
| 8,389,177 | B2 | 3/2013 | Fly et al. |
| 9,443,782 | B1 | 9/2016 | Steimle et al. |
| 2003/0087141 | A1 | 5/2003 | Sun et al. |
| 2003/0087156 | A1 | 5/2003 | Broman et al. |
| 2003/0099884 | A1 | 5/2003 | Chiang et al. |
| 2004/0131916 | A1 | 7/2004 | Hodge et al. |
| 2004/0191623 | A1 | 9/2004 | Kubata et al. |
| 2004/0224190 | A1 | 11/2004 | Sasahara et al. |
| 2004/0233616 | A1 | 11/2004 | Arai et al. |
| 2005/0098435 | A1 | 5/2005 | Jacobson et al. |
| 2005/0158615 | A1 | 7/2005 | Samuel et al. |
| 2005/0260473 | A1 | 11/2005 | Wang |
| 2006/0068265 | A1 | 3/2006 | Hanlon et al. |
| 2007/0037037 | A1 | 2/2007 | Nguyen et al. |
| 2007/0054175 | A1 | 3/2007 | Maendle et al. |
| 2007/0125493 | A1 | 6/2007 | Jang et al. |
| 2007/0227654 | A1 | 10/2007 | Liu et al. |
| 2007/0287047 | A1 | 12/2007 | Kaiser et al. |
| 2008/0038622 | A1 | 2/2008 | Valensa et al. |
| 2008/0142152 | A1 | 6/2008 | Debe et al. |
| 2008/0152839 | A1 | 6/2008 | Han et al. |
| 2008/0291027 | A1 | 11/2008 | Lake |
| 2008/0292964 | A1* | 11/2008 | Kazacos ............ B60L 11/1879 429/231.5 |
| 2008/0305385 | A1 | 12/2008 | Smiljanich et al. |
| 2008/0318110 | A1 | 12/2008 | Budinski et al. |
| 2010/0003545 | A1 | 1/2010 | Horne et al. |
| 2010/0047650 | A1 | 2/2010 | Iino et al. |
| 2010/0291442 | A1 | 11/2010 | Wang et al. |
| 2011/0223450 | A1 | 9/2011 | Horne et al. |
| 2011/0244277 | A1 | 10/2011 | Gordon, II et al. |
| 2012/0040254 | A1 | 2/2012 | Amendola et al. |
| 2012/0258345 | A1 | 10/2012 | Zaffou et al. |
| 2013/0037760 | A1* | 2/2013 | Maeda ............... H01M 8/0213 252/511 |
| 2013/0071714 | A1 | 3/2013 | Perry et al. |
| 2013/0095361 | A1 | 4/2013 | Sinsabaugh et al. |
| 2013/0157097 | A1 | 6/2013 | Kampanatsanyakorn et al. |
| 2013/0266829 | A1 | 10/2013 | Cole et al. |
| 2014/0030573 | A1* | 1/2014 | Esswein ............ H01M 10/4242 429/107 |
| 2014/0051007 | A1 | 2/2014 | Blanchet et al. |
| 2014/0227574 | A1* | 8/2014 | Savinell ............... H01M 8/188 429/107 |
| 2014/0234734 | A1 | 8/2014 | Tsutsumi et al. |
| 2014/0308594 | A1 | 10/2014 | Dudney et al. |
| 2014/0349147 | A1 | 11/2014 | Shaffer, II et al. |
| 2014/0370404 | A1 | 12/2014 | Kato et al. |
| 2015/0079493 | A1 | 3/2015 | Guthrie |
| 2015/0099199 | A1 | 4/2015 | Bazant et al. |
| 2015/0136301 | A1 | 5/2015 | Cyman, Jr. et al. |
| 2016/0020477 | A1 | 1/2016 | Smeltz et al. |
| 2016/0036060 | A1 | 2/2016 | Brezovec |
| 2016/0240868 | A1 | 8/2016 | Warrington et al. |
| 2017/0054164 | A1 | 2/2017 | Goeltz et al. |

FOREIGN PATENT DOCUMENTS

| | | |
|---|---|---|
| JP | H-06-290795 | 10/1994 |
| JP | 2001-283879 A | 10/2001 |
| JP | 2005-228633 A | 8/2005 |
| JP | 2008-047313 A | 2/2008 |
| JP | 2008-078104 A | 4/2008 |
| JP | 2008-091110 A | 4/2008 |
| JP | 2008-166260 A | 7/2008 |
| JP | 2011-228059 A | 11/2011 |
| JP | 2012-252955 A | 12/2012 |
| JP | 2014-520382 A | 8/2014 |
| WO | WO-00/16418 A1 | 3/2000 |
| WO | WO-2010/033118 A1 | 3/2010 |
| WO | WO-2012/177255 A1 | 12/2012 |

OTHER PUBLICATIONS

R.P. Hollandsworth, et al., "Zinc/Ferricyanide Battery Development Phase IV," U.S. Department of Energy Report for Contract DE-AC04-76DP00789, May 1985, 278 pages.

Soloveichik, "Flow Batteries: Current Status and Trends," 2015, Chem. Rev., 115 (20), pp. 11533-11558.

International Search Report and Written Opinion dated Jan. 26, 2017, which issued in International Application No. PCT/US16/57963.

International Search Report and Written Opinion dated Jan. 19, 2017, which issued in International Application No. PCT/US16/56672.

Japanese Office Action from 2016-544047, dated Jul. 3, 2018, 11 pages.

Extended European Search Report from European Patent Application No. 14845729.4, dated May 8, 2017.

International Search Report and Written Opinion from PCT/US2017/030452, dated Jul. 3, 2017.

Ma et al., "High-performance supercapacitor electrodes based on porous flexible carbon nanofiber paper treated by surface chemical etching," Chemical Engineering Journal, Aug. 2014.

McCreery, "Advanced Carbon Electrode Materials for Molecular Electrochemistry," Chem Rev, 2008, pp. 2646-2687, vol. 108.

\* cited by examiner

MITIGATION OF PARASITIC REACTIONS WITHIN FLOW BATTERIES

CROSS-REFERENCE TO RELATED APPLICATIONS

The present application claims the benefit of priority under 35 U.S.C. § 119 from U.S. Provisional Patent Application 62/147,702, filed on Apr. 15, 2015 and incorporated herein by reference in its entirety.

STATEMENT REGARDING FEDERALLY SPONSORED RESEARCH OR DEVELOPMENT

Not applicable.

FIELD

The present disclosure generally relates to energy storage and, more specifically, to mitigating the occurrence of parasitic reactions in flow batteries and related electrochemical systems.

BACKGROUND

Electrochemical energy storage systems, such as batteries, supercapacitors and the like, have been widely proposed for large-scale energy storage applications. Various battery designs, including flow batteries, have been considered for this purpose. Compared to other types of electrochemical energy storage systems, flow batteries can be advantageous, particularly for large-scale applications, due to their ability to decouple the parameters of power density and energy density from one another.

Flow batteries generally include negative and positive active materials in corresponding electrolyte solutions, which are flowed separately across opposing faces of a membrane or separator in an electrochemical cell containing negative and positive electrodes. The flow battery is charged or discharged through electrochemical reactions of the active materials that occur inside the two half-cells. As used herein, the terms "active material," "electroactive material," "redox-active material" or variants thereof will synonymously refer to materials that undergo a change in oxidation state during operation of a flow battery or like electrochemical energy storage system (i.e., during charging or discharging). Transition metals and their coordination complexes can be particularly desirable active materials due to their multiple oxidation states.

Although flow batteries hold significant promise for large-scale energy storage applications, they have often been plagued by sub-optimal energy storage performance (e.g., round trip energy efficiency) and limited cycle life, among other factors. Certain factors leading to poor energy storage performance are discussed hereinafter. Despite significant investigational efforts, no commercially viable flow battery technologies have yet been developed.

Oxidation and reduction of the active materials in a flow battery are desirable electrochemical reactions, since they contribute to the battery's proper operation during charging and discharging cycles. Such reactions may be referred to herein as "productive reactions."

In addition to desirable productive reactions, undesirable parasitic reactions can also occur within one or both half-cells of flow batteries and related electrochemical systems. As used herein, the term "parasitic reaction" will refer to any side electrochemical reaction that takes place in conjunction with productive reactions. Parasitic reactions can often involve a component of an electrolyte solution that is not the active material. Without being bound by any theory or mechanism, components within an electrolyte solution can achieve sufficient overpotential under some conditions to drive the occurrence of parasitic reactions. Stated alternately, the components of an electrolyte solution can be sufficiently reducing or sufficiently oxidizing under certain conditions to affect parasitic reactions. Parasitic reactions that can commonly occur in electrochemical cells containing an aqueous electrolyte solution are evolution of hydrogen and/or oxidation by oxygen. Hydrogen evolution, for example, can at least partially discharge the negative electrolyte of an electrochemical system while leaving the positive electrolyte unchanged. In addition, parasitic reactions can change the pH of an electrolyte solution, which can destabilize the active material therein in some cases. In non-aqueous electrolyte solutions, the electrolyte solvent can be oxidized or reduced in a parasitic reaction. Further, in both aqueous and non-aqueous systems, electrode materials and other surfaces can also undergo parasitic reactions (e.g., carbon or metal corrosion, separator oxidation, or the like) in some instances.

Discharge associated with parasitic reactions can decrease the operating efficiency and other performance parameters of a flow battery. In the case of a parasitic reaction that occurs preferentially in one half-cell over the other, an imbalance in state of charge can result between the negative and positive electrolyte solutions. The term "state of charge" (SOC) is a well understood electrochemical energy storage term that will refer herein to the relative amounts of reduced and oxidized species at an electrode within a given half-cell of an electrochemical system. Charge imbalance between the electrolyte solutions of a flow battery can lead to mass transport limitations at one of the electrodes, thereby lowering the round-trip operating efficiency. Since the charge imbalance can be additive with each completed charge and discharge cycle, increasingly diminished performance of a flow battery can result due to parasitic reactions.

Charge rebalancing of one or both electrolyte solutions can be conducted to combat the effects of parasitic reactions. Although various charge rebalancing techniques are available, they can be costly and time-consuming to implement. Determining the true concentration of oxidized and reduced active material species in an electrolyte solution can oftentimes itself be difficult, thereby adding a further difficulty to the charge rebalancing process.

In view of the foregoing, flow batteries configured to decrease the incidence of parasitic reactions and methods for mitigating parasitic reactions would be highly desirable in the art. The present disclosure satisfies the foregoing needs and provides related advantages as well.

SUMMARY

In some embodiments, the present disclosure provides flow batteries including a first half-cell containing a first electrode, a second half-cell containing a second electrode, a separator disposed between the first half-cell and the second half-cell, a first bipolar plate overlaying and contacting the first electrode, and a second bipolar plate overlaying and contacting the second electrode. The first electrode and the second electrode overlay and contact opposing faces of the separator. A portion of the first electrode or the first bipolar plate contains a dielectric material, but such that the first electrode and the first bipolar plate collectively define a contiguous electrically conductive pathway within the first half-cell.

In other various embodiments, flow batteries of the present disclosure include a first half-cell containing a first electrode, a second half-cell containing a second electrode, and a separator disposed between the first half-cell and the second half-cell. The first electrode and the second electrode overlay and contact opposing faces of the separator. The first electrode has a thickness of about 100 microns or less.

In some embodiments, the present disclosure describes methods for mitigating the occurrence of parasitic reactions in an electrochemical cell, such as within a flow battery. The methods include forming an electrochemical cell containing: a first half-cell containing a first electrode, a second half-cell containing a second electrode, a separator disposed between the first half-cell and the second half-cell, a first bipolar plate overlaying and contacting the first electrode, and a second bipolar plate overlaying and contacting the second electrode; and incorporating a dielectric material in a portion of the first electrode or the first bipolar plate, but such that the first electrode and the first bipolar plate collectively define a contiguous electrically conductive pathway within the first half-cell. The first electrode and the second electrode overlay and contact opposing faces of the separator.

In still other various embodiments, methods for mitigating parasitic reactions in a flow battery include providing a separator, depositing a catalyst layer upon at least a first face of the separator, and forming a flow battery having the catalyst layer in contact with a bipolar plate in at least a first half-cell of the flow battery.

The foregoing has outlined rather broadly the features of the present disclosure in order that the detailed description that follows can be better understood. Additional features and advantages of the disclosure will be described hereinafter. These and other advantages and features will become more apparent from the following description.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

The present disclosure is directed, in part, to flow batteries having a decreased incidence of parasitic reactions during operation. The present disclosure is also directed, in part, to methods for decreasing an incidence of parasitic reactions in flow batteries and related electrochemical systems.

The present disclosure may be understood more readily by reference to the following description taken in connection with the accompanying figures and examples, all of which form a part of this disclosure. It is to be understood that this disclosure is not limited to the specific products, methods, conditions or parameters described and/or shown herein. Further, the terminology used herein is for purposes of describing particular embodiments by way of example only and is not intended to be limiting unless otherwise specified. Similarly, unless specifically stated otherwise, any description herein directed to a composition is intended to refer to both solid and liquid versions of the composition, including solutions and electrolytes containing the composition, and electrochemical cells, flow batteries, and other energy storage systems containing such solutions and electrolytes. Further, it is to be recognized that where the disclosure herein describes an electrochemical cell, flow battery, or other energy storage system, it is to be appreciated that methods for operating the electrochemical cell, flow battery, or other energy storage system are also implicitly described.

It is also to be appreciated that certain features of the present disclosure may be described herein in the context of separate embodiments for clarity purposes, but may also be provided in combination with one another in a single embodiment. That is, unless obviously incompatible or specifically excluded, each individual embodiment is deemed to be combinable with any other embodiment(s) and the combination is considered to represent another distinct embodiment. Conversely, various features of the present disclosure that are described in the context of a single embodiment for brevity's sake may also be provided separately or in any sub-combination. Finally, while a particular embodiment may be described as part of a series of steps or part of a more general structure, each step or sub-structure may also be considered an independent embodiment in itself.

Unless stated otherwise, it is to be understood that each individual element in a list and every combination of individual elements in that list is to be interpreted as a distinct embodiment. For example, a list of embodiments presented as "A, B, or C" is to be interpreted as including the embodiments "A," "B," "C," "A or B," "A or C," "B or C," or "A, B, or C."

In the present disclosure, the singular forms of the articles "a," "an," and "the" also include the corresponding plural references, and reference to a particular numerical value includes at least that particular value, unless the context clearly indicates otherwise. Thus, for example, reference to "a material" is a reference to at least one of such materials and equivalents thereof.

In general, use of the term "about" indicates approximations that can vary depending on the desired properties sought to be obtained by the disclosed subject matter and is to be interpreted in a context-dependent manner based on functionality. Accordingly, one having ordinary skill in the art will be able to interpret a degree of variance on a case-by-case basis. In some instances, the number of significant figures used when expressing a particular value may be a representative technique of determining the variance permitted by the term "about." In other cases, the gradations in a series of values may be used to determine the range of variance permitted by the term "about." Further, all ranges in the present disclosure are inclusive and combinable, and references to values stated in ranges include every value within that range.

As discussed above, energy storage systems that are operable on a large scale while maintaining high efficiency values can be extremely desirable. Flow batteries have generated significant interest in this regard, but there remains considerable room for improving their operating characteristics. Parasitic reactions can be exceedingly detrimental to the operating performance of flow batteries and other electrochemical systems. For example, parasitic reactions can create an imbalance in state of charge between the two electrolyte solutions of a flow battery, which can impact the battery's performance over time and repeated cycles of charging and discharging. In addition, parasitic reactions can lead to undesirable changes in the pH of one or more of the electrolyte solutions. In conventional flow battery designs, parasitic reactions can be difficult to manage due to a number of operational difficulties.

Given the detrimental effects of parasitic reactions and the difficulties associated with managing such reactions, the present inventors recognized that it would be highly desirable to minimize the incidence of parasitic reactions within a flow battery. Conventional flow battery designs offer no appreciable mechanism for minimizing the incidence of parasitic reactions other than by changing the flow battery's operating conditions such that an overpotential is not exceeded and accompanying parasitic reactions do not occur, or by changing the battery's composition altogether. By changing the operating conditions such that an overpotential for parasitic reactions is not exceeded, however, desired productive reactions of the active material may not occur at all or may not occur with sufficient rapidity. Thus, changing the operating conditions of a flow battery to mitigate parasitic reactions can be an untenable approach in some circumstances. Before further discussing the approaches the present inventors discovered for decreasing the incidence of parasitic reactions in flow batteries, illustrative flow battery configurations and their operating characteristics will first be described in greater detail hereinafter.

Figure 1:
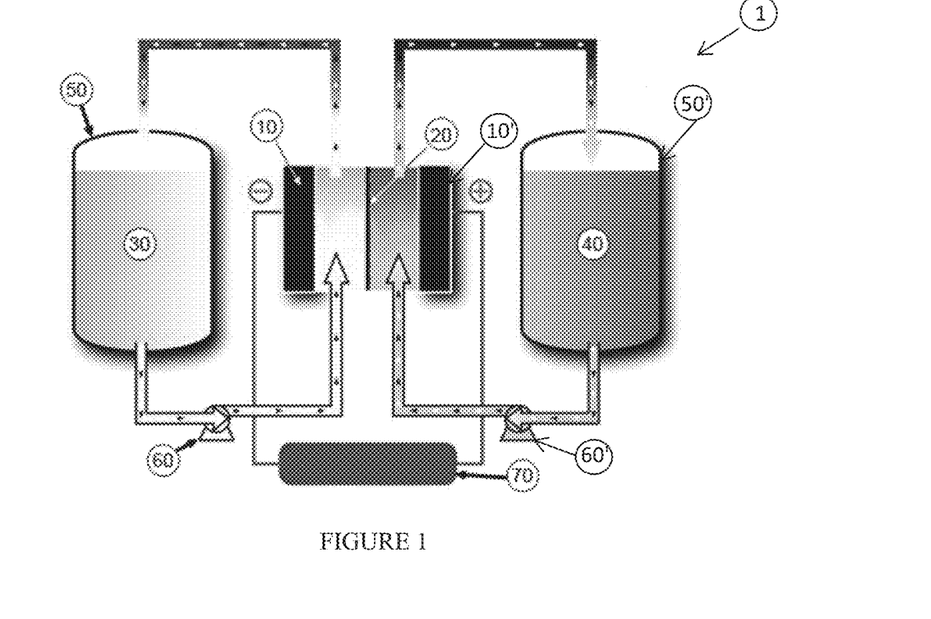
FIG. 1 shows a schematic of an illustrative flow battery containing a single electrochemical cell.

Unlike typical battery technologies (e.g., Li-ion, Ni-metal hydride, lead-acid and the like), where active materials and other components are housed in a single assembly, flow batteries transport (e.g., via pumping) redox-active energy storage materials from storage tanks through an electrochemical stack containing one or more electrochemical cells. This design feature decouples the electrical energy storage system power from the energy storage capacity, thereby allowing for considerable design flexibility and cost optimization. FIG. 1 shows a schematic of an illustrative flow battery containing a single electrochemical cell. Although FIG. 1 shows a flow battery containing a single electrochemical cell, approaches for combining multiple electrochemical cells together are known and are discussed hereinbelow.

Figure 2:
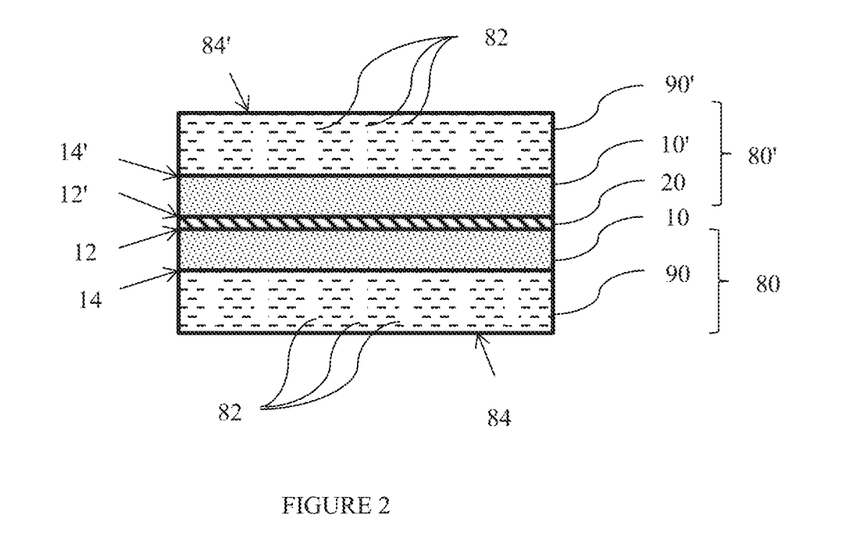
FIG. 2 shows a schematic of an illustrative electrochemical cell configuration containing a bipolar plate.

As shown in FIG. 1, flow battery system 1 includes an electrochemical cell that features between the two electrodes 10 and 10' of the electrochemical cell. As used herein, the terms "separator" and "membrane" will refer to an ionically conductive and electrically insulating material disposed between the positive and negative electrodes of an electrochemical cell. Electrodes 10 and 10' are formed from a suitably conductive material, such as a metal, carbon, graphite, and the like, and the materials for two can be the same or different. Although FIG. 1 has shown electrodes 10 and 10' as being spaced apart from separator 20, electrodes 10 and 10' can also be disposed in contact with separator 20 in more particular embodiments (see FIG. 2 below). In some instances, the contact can be direct, as depicted in FIG. 2, and in other instances, the contact can be indirect, such as through an intervening carbon cloth or carbon foam. The material(s) forming electrodes 10 and 10' can be porous, such that they have a high surface area for contacting the electrolyte solutions containing first active material 30 and second active material 40, which are capable of being cycled between an oxidized state and a reduced state.

Pump 60 affects transport of first active material 30 from tank 50 to the electrochemical cell. The flow battery also suitably includes second tank 50' that contains second active material 40. Second active material 40 can be the same material as first active material 30, or it can be different. Second pump 60' can affect transport of second active material 40 to the electrochemical cell. Pumps can also be used to affect transport of active materials 30 and 40 from the electrochemical cell back to tanks 50 and 50' (not shown in FIG. 1). Other methods of affecting fluid transport, such as siphons, for example, can also suitably transport first and second active materials 30 and 40 into and out of the electrochemical cell. Also shown in FIG. 1 is power source or load 70, which completes the circuit of the electrochemical cell and allows a user to collect or store electricity during its operation.

It should be understood that FIG. 1 depicts a specific, non-limiting configuration of a particular flow battery. Accordingly, flow batteries consistent with the spirit of the present disclosure can differ in various aspects relative to the configuration of FIG. 1. As one example, a flow battery system can include one or more active materials that are solids, gases, and/or gases dissolved in liquids. Active materials can be stored in a tank, in a vessel open to the atmosphere, or simply vented to the atmosphere.

As indicated above, multiple electrochemical cells can also be combined with one another in an electrochemical stack in order to increase the rate that energy can be stored and released during operation. The amount of energy released is determined by the overall amount of active material that is present. An electrochemical stack utilizes bipolar plates between adjacent electrochemical cells to establish electrical communication but not fluid communication between the two cells. Thus, bipolar plates contain the electrolyte solutions within the individual electrochemical cells. Bipolar plates are generally fabricated from electrically conductive materials but are fluidically non-conductive on the whole. Suitable materials can include carbon, graphite, metal, or a combination thereof. Bipolar plates can also be fabricated from non-conducting polymers having a conductive material dispersed therein, such as carbon particles or fibers, metal particles or fibers, and/or carbon nanotubes. Although bipolar plates can be fabricated from the same types of conductive materials as can the electrodes of an electrochemical cell, they can lack the continuous porosity permitting an electrolyte solution to flow completely through the latter. It should be recognized, however, that bipolar plates are not necessarily entirely non-porous entities, however. Bipolar plates can have innate or designed porous features that provide a greater surface area for allowing an electrolyte solution to contact the bipolar plate, but the porous features terminate at a location before the electrolyte solution can enter an adjacent electrochemical cell. For example, bipolar plates can contain designed flow channels that permit an electrolyte solution to contact the bipolar plate more effectively but without the electrolyte solution passing through to an adjacent electrochemical cell. A bipolar plate can directly contact the electrode within the electrochemical cell in which it is disposed, or there can be an intervening conductive material, such as a carbon foam, carbon cloth, carbon mesh, or the like.

FIG. 2 shows a schematic of an illustrative electrochemical cell configuration containing a bipolar plate. Where appropriate, common reference characters will be used to describe elements shown in a preceding FIGURE. Referring to FIG. 2, negative half-cell 80 and positive half-cell 80' are disposed on opposing sides of separator 20. Negative half-cell 80 contains electrode 10 (i.e., the anode) abutted with separator 20 at interface 12, and bipolar plate 90 is, in turn, abutted against the opposing face of electrode 10 at interface 14. Positive half-cell 80' similarly contains electrode 10' (i.e., the cathode) abutted with the opposing face of separator 20 at interface 12', and bipolar plate 90' is, in turn, abutted against the opposing face of electrode 10' at interface 14'. In alternative embodiments, electrodes 10 and 10' can have a carbon foam or cloth intervening in between separator 20. Channels 82 extend partially within the interior of bipolar plates 90 and 90' and increase the degree of contact with the electrolyte solution. Although FIG. 2 has depicted channels 82 as being substantially straight and regularly spaced, it is to be recognized that channels 82 can be of any shape and/or be interconnected to one another, such as in a tortuous path, and/or be distributed randomly or in a gradient pattern. In either case, back faces 84 and 84' of bipolar plates 90 and 90' are substantially impermeable to the passage of electrolyte solution to prevent crossover from occurring between adjacent electrochemical cells. In the interest of clarity, the fluid flow details shown in FIG. 1 are not presented in FIG. 2. However, it can be readily appreciated how the electrochemical cell configuration of FIG. 2 would be incorporated in FIG. 1, or how a plurality of electrochemical cells can be incorporated an electrochemical stack and connected to a fluid distribution manifold. For purposes of discussion herein, the electrochemical cell configuration of FIG. 2 will be considered representative of that used in a conventional flow battery.

Returning now to the mitigation of parasitic reactions, the inventors discovered that the vast majority of productive reactions in conventional electrochemical cells occur at or in close proximity to the interface between the electrodes and the separator (i.e., at interfaces 12 and 12'). Parasitic reactions, in contrast, are more prevalent at locations within the electrodes and other conductive surfaces that are more distant from the separator. In addition, parasitic reactions can also occur upon contacting the electrolyte solution with the conductive material of a bipolar plate. Accordingly, the inventors discovered that parasitic reactions occur at one or more locations in an electrochemical cell that are not in proximity to the separator.

As a solution for decreasing the incidence of parasitic reactions at one or more locations not in proximity to the separator, the inventors discovered a variety of ways that the electrodes, the bipolar plate, or both structures of an electrochemical cell can be modified to maintain good electrical conductivity, promote the occurrence of productive reactions, and decrease the incidence of unwanted parasitic reactions. Although the separator or the bipolar plate are shown as being modified separately in the disclosure provided hereinafter, it is to be recognized that both structures can be modified concurrently in a given electrochemical cell while still remaining consistent with the intent of the present disclosure. Modification of both the electrode and the bipolar plate of an electrochemical cell can provide an even greater decrease in the incidence of parasitic reactions.

In particular, the inventors discovered that decreasing the area of contact between an electrolyte solution and an electrode and/or a bipolar plate can correspondingly decrease the incidence of parasitic reactions. Suitable ways in which the area of contact can be decreased are discussed in more detail hereinafter.

In the case of electrodes, the inventors discovered that one suitable approach for decreasing the incidence of parasitic reactions involves infusing a dielectric material into an internal portion of the electrode. The dielectric material can coat the electrode surface within the porous interior and thereby preclude contact of a substantial portion of the electrode with an electrolyte solution. By precluding contact of an electrolyte solution with non-productive or less productive portions of the electrode, the prevalence of parasitic reactions can be decreased. The surface of the electrode at the interface with the separator can remain uncoated, leaving that portion of the electrode free to promote productive reactions. Since only a surface coating of the dielectric material is present in the pores of the electrode, the coating does not significantly impede circulation of an electrolyte solution through the electrode. Moreover, since only an internal surface coating of the dielectric material is present, the electrode as a whole can still maintain electrical conductivity for establishing a contiguous electrically conductive pathway in conjunction with a bipolar plate.

Figure 3:
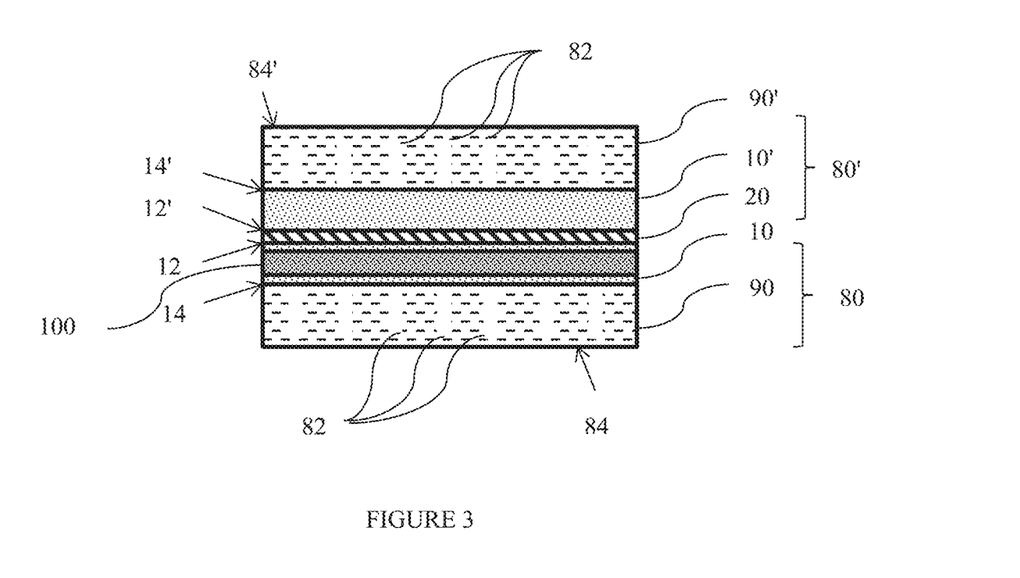
FIG. 3 shows a schematic of an illustrative electrochemical cell configuration in which an internal portion of an electrode has been coated with a dielectric material to decrease the incidence of parasitic reactions.

FIG. 3 shows a schematic of an illustrative electrochemical cell configuration in which an internal portion of an electrode has been coated with a dielectric material to decrease the incidence of parasitic reactions. Other than dielectric coating 100 within the interior of electrode 10, the electrochemical cell configuration of FIG. 3 is identical to that of FIG. 2 and may be better understood by reference thereto. As indicated above, the uncoated portions of electrode 10 can provide an effective surface at which productive reactions can still occur and/or which can maintain electrical contact with bipolar plate 90. The effective surface for productive reactions and electrical contact can be maintained since the dielectric material is not in contact with separator 20 or bipolar plate 90. Although FIG. 3 has shown only electrode 10 as containing a dielectric-coated internal portion, it is to be recognized that electrode 10' or both electrodes 10 and 10' can contain a dielectric-coated internal portion in some embodiments of the present disclosure. In some embodiments, electrode 10 and dielectric coating 100 can be present in the negative half-cell of the electrochemical cell.

Coating an internal portion of an electrode with a dielectric material increases the relative percentage of the electrode where productive reactions can take place. By deactivating the portions of the electrode that are not in sufficient proximity to the separator, the relative percentage of the electrode where productive reactions can occur is increased. Bearing this feature in mind, the inventors further recognized that internally coating the electrode with a dielectric material in the foregoing manner effectively reduces the through-plane thickness of the electrode, thereby placing a greater active percentage of the electrode in proximity to the separator. Accordingly, in another aspect of the present disclosure, the inventors discovered that the incidence of parasitic reactions can similarly be decreased by lowering the through-plane thickness of the electrode (see FIGS. 4 and 5 and accompanying description below). That is, the inventors discovered that thinner electrodes can provide a similar decrease in the incidence of parasitic reactions without utilizing a dielectric material.

Figure 4:
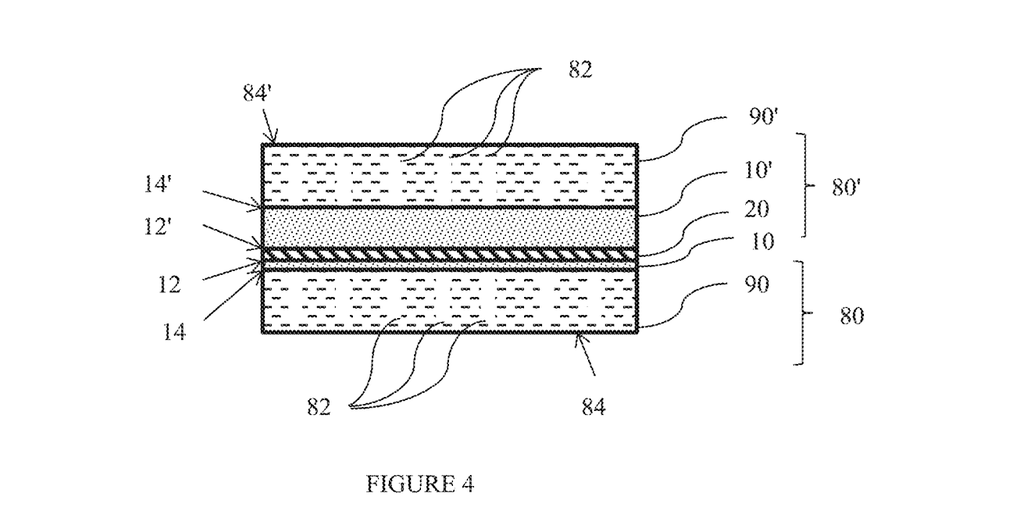
FIG. 4 shows a schematic of an illustrative electrochemical cell configuration in which the through-plane thickness of an electrode has been lowered to decrease the incidence of parasitic reactions.

FIG. 4 shows a schematic of an illustrative electrochemical cell configuration in which the through-plane thickness of an electrode has been lowered to decrease the incidence of parasitic reactions. Other than the decreased thickness of electrode 10, the electrochemical cell configuration of FIG. 4 is identical to that of FIG. 2 and may be better understood by reference thereto. The decreased through-plane thickness of electrode 10 in FIG. 4 places more of the electrode area in proximity to separator 20, thereby decreasing the incidence of parasitic reactions. Although FIG. 4 has shown only electrode 10 as having a decreased through-plane thickness, it is again to be recognized that electrode 10' or both electrodes 10 and 10' can be decreased in thickness in some embodiments of the present disclosure. Moreover, in various embodiments of the present disclosure, electrodes 10 and 10' can have substantially the same thickness, or the thicknesses of electrodes 10 and 10' can differ from one another. In some embodiments, a suitably thin electrode can have a thickness of about 100 microns or less, such as a thickness ranging between about 1 micron and about 100 microns, or between about 20 microns and about 100 microns, or between about 50 microns and about 100 microns.

In other various embodiments, a suitably thin electrode can have a thickness under about 1 micron. In more particular embodiments, a suitably thin electrode can have a thickness ranging between about 1 nm and about 100 nm, or between about 1 nm and about 10 nm, or between about 10 nm and about 50 nm, or between about 5 nm and about 20 nm. In some embodiments, one or more sheets of graphene can constitute the electrode. The high in-plane electrical conductivity of graphene, it high mechanical strength, and its small layer thicknesses can make this material particularly suitable for forming an electrode in a flow battery.

Although suitably thin electrodes can allow the incidence of parasitic reactions to be decreased by placing more of the electrode in proximity to the separator, such thin electrode materials can be difficult to handle during manufacturing and can be less durable than thicker electrodes. Accordingly, the inventors also discovered further ways by which the through-plane thickness of a traditional electrode could be altered in order to decrease the incidence of parasitic reactions, again without modifying the electrode with a dielectric material. More particularly, the inventors also discovered that a traditional electrode abutted with the separator could instead be replaced with a catalyst layer deposited upon the separator. The catalyst layer can constitute a continuous or discontinuous coating upon the separator. The catalyst layer can effectively function as an extremely thin and porous electrode upon which productive reactions can occur in very close proximity to the separator, while also allowing an electrical connection to be established to a bipolar plate. Suitable materials for inclusion in the catalyst layer can include high-surface area materials such as carbon nanotubes, carbon powders, graphite and the like.

Figure 5:
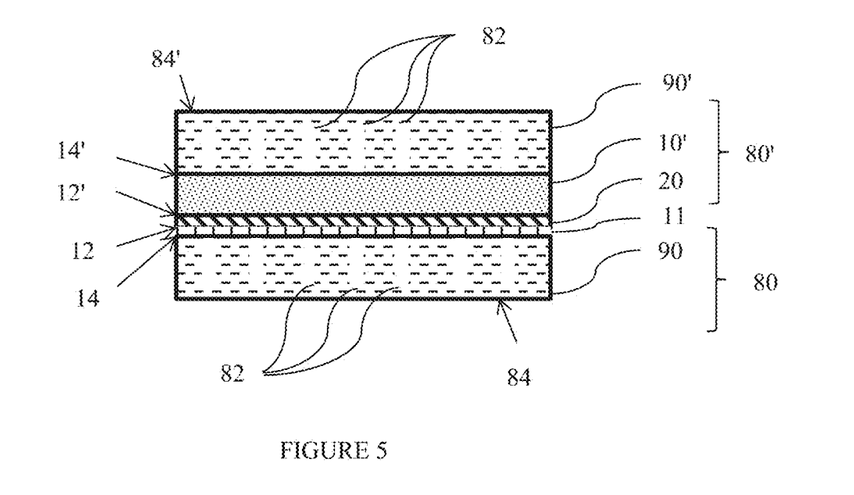
FIG. 5 shows a schematic of an illustrative electrochemical cell configuration in which a catalyst layer has been deposited on a separator to decrease the incidence of parasitic reactions.

FIG. 5 shows a schematic of an illustrative electrochemical cell configuration in which a catalyst layer has been deposited on a separator to decrease the incidence of parasitic reactions. Other than the replacement of electrode 10 with catalyst layer 11, the electrochemical cell configuration of FIG. 5 is identical to that of FIG. 2 and may be better understood by reference thereto. Again, the small thickness of catalyst layer 11 in FIG. 5 places a high amount of the "electrode" area in proximity to separator 20 where productive reactions can more effectively occur. For example, catalyst layer 11 can be about 100 microns or less in some embodiments. Although FIG. 5 has shown only electrode 10 as being replaced by catalyst layer 11, it is again to be recognized that electrode 10' or both electrodes 10 and 10' can be replaced with a catalyst layer in some embodiments of the present disclosure. When both electrodes 10 and 10' have been replaced, the catalyst material within half-cells 80 and 80' can be the same or different.

In some embodiments, the catalyst layer can include a plurality of carbon nanotubes. The carbon nanotubes can serve as a very thin and porous matrix having a high degree of electrical conductivity. In some embodiments, catalyst particles (e.g., metal nanoparticles) can be mixed within the carbon nanotubes in the catalyst layer. In some embodiments, the carbon nanotubes can be deposited as a layer in which the longitudinal axes of the carbon nanotubes are substantially parallel to the separator. In this configuration, the carbon nanotubes can provide high in-plane electrical conductivity near the separator to promote productive reactions and still establish an electrical connection to the bipolar plate. Suitable techniques for aligning carbon nanotubes will be evident to one having ordinary skill in the art.

Suitable carbon nanotubes for inclusion in the catalyst layer can include single-wall carbon nanotubes, double-wall carbon nanotubes, multi-wall carbon nanotubes, or any combination thereof. The carbon nanotubes can be metallic, semimetallic, or semiconducting depending on their chirality. An established system of nomenclature for designating a carbon nanotube's chirality is recognized in the art and is distinguished by a double index (n,m), where n and m are integers that describe the cut and wrapping of hexagonal graphite when formed into a tubular structure. In addition to chirality, a carbon nanotube's diameter also influences its electrical and thermal conductivity values. Multi-wall carbon nanotubes typically have more complex electrical and thermal conductivity profiles than do single-wall carbon nanotubes due to interwall reactions that can occur between the individual nanotube layers. By contrast, there is no change in the electrical and thermal conductivity profiles across different portions of a single-wall carbon nanotube. Accordingly, in more particular embodiments of the present disclosure, the catalyst layer can include a plurality of single-wall carbon nanotubes due to their favorable conductivity values.

In still another alternative configuration, the present inventors discovered that the concepts of a catalyst layer and a dielectric material could be combined with one another in a hybrid electrode architecture having a through-plane thickness more similar to that of traditional electrodes. Advantageously, such electrode structures, discussed in more detail hereinafter, can maintain a small region in proximity to the separator where productive reactions can more effectively take place while still retaining capabilities for establishing an electrical connection with a bipolar plate.

In more particular embodiments, a hybrid electrode architecture can include a conductive medium disposed on a first side of a conductive mesh and a dielectric material disposed on a second side of the conductive mesh. The conductive mesh and the dielectric material can be positioned such that the conductive medium contacts the separator and allows a high extent of productive reactions to occur. The hybrid electrode architecture also includes a plurality of conductive posts extending through the dielectric material from the conductive mesh to a bipolar plate to establish a contiguous electrically conductive pathway in an electrochemical cell, even though the dielectric material contacts the bipolar plate. Without the conductive posts being present in the hybrid electrode architecture and contacting the bipolar plate, the dielectric material would preclude establishment of an electrical connection between the electrode and the bipolar plate.

Figure 6:
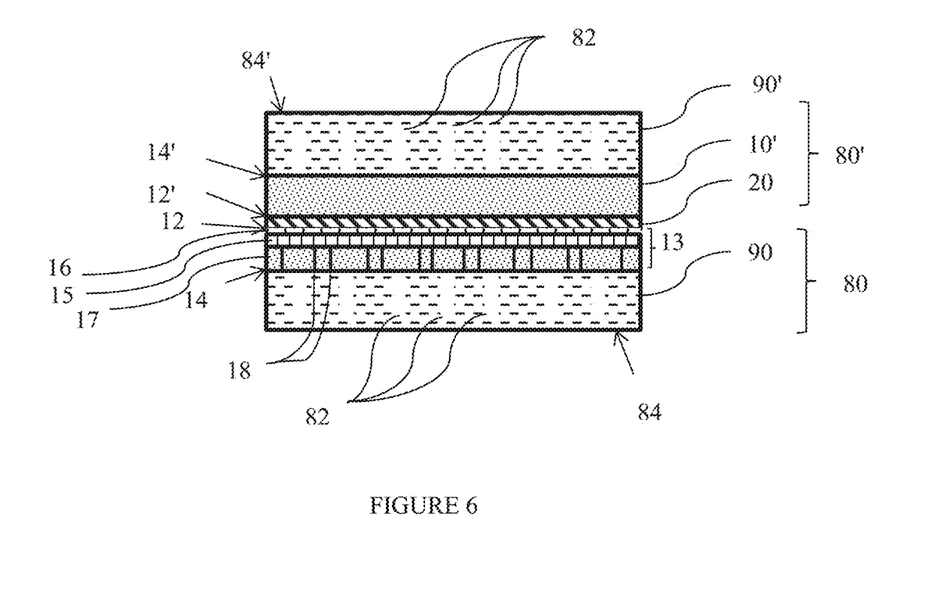
FIG. 6 shows a schematic of an illustrative electrochemical cell configuration in which hybrid electrode architecture is present.

FIG. 6 shows a schematic of an illustrative electrochemical cell configuration in which hybrid electrode architecture is present. Other than the replacement of electrode 10 with hybrid electrode 13, the electrochemical cell configuration of FIG. 6 is identical to that of FIG. 2 and may be better understood by reference thereto. Hybrid electrode 13 contains conductive mesh 15, having conductive material 16 disposed on one side and dielectric material 17 on the other. Conductive material 16 contacts separator 20, and dielectric material 17 contacts bipolar plate 90. Conductive posts 18 extend through dielectric material 17 from conductive mesh 15 to bipolar plate 90 and establish an electrical connection therewith. Although FIG. 6 has shown only electrode 10 as being replaced by hybrid electrode 13, it is again to be recognized that electrode 10' or both electrodes 10 and 10' can be replaced with a hybrid electrode in some embodiments of the present disclosure. Suitable substances for conductive material 16 can include any conductive material disclosed herein, such as those utilized in conventional electrode. Conductive mesh 15 can similarly be formed from any suitable conductive material.

Turning now to the bipolar plate, the inventors discovered various approaches for lowering the amount of conductive material within a bipolar plate in contact with an electrolyte solution, thereby mitigating the incidence of parasitic reactions. Some of these approaches bear some similarity to those discussed above in regard to electrodes, and may be more thoroughly understood by reference thereto. More particularly, the inventors discovered that by incorporating a dielectric material within a portion of a bipolar plate but without completely compromising its electrical conductivity, the incidence of parasitic reactions can be decreased. Suitable locations in a bipolar plate that can be modified with a dielectric material to decrease the incidence of parasitic reactions will now be described in further detail.

In one configuration, the inventors discovered that coating at least a portion of an internal portion of a bipolar plate can decrease the incidence of parasitic reactions. More particularly, the inventors discovered that by coating at least a portion of the channels within a bipolar plate with a dielectric material, the degree of contact between an electrolyte solution and the conductive material within the bipolar plate can be significantly lowered. As discussed above, this can limit the ability of the conductive material to promote parasitic reactions, but without compromising the bipolar plate's electrical conductivity. This approach is somewhat similar to that described above for coating an internal portion of an electrode with a dielectric material.

Figure 7:
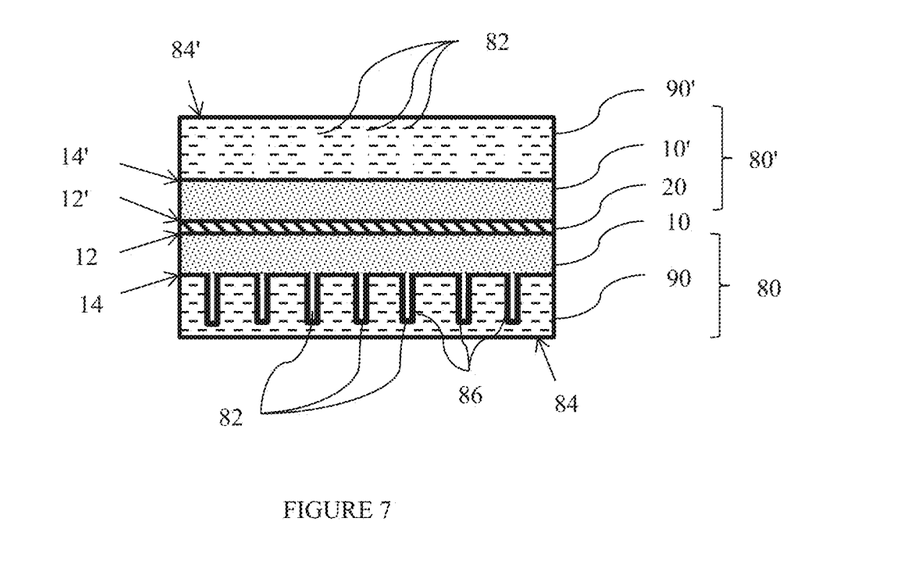
FIG. 7 shows a schematic of an illustrative electrochemical cell configuration in which the channels of a bipolar plate have been coated with a dielectric material to decrease the incidence of parasitic reactions.

FIG. 7 shows a schematic of an illustrative electrochemical cell configuration in which the channels of a bipolar plate have been coated with a dielectric material to decrease the incidence of parasitic reactions. Other than the internal coating of channels 82 in bipolar plate 90 with coating layer 86, the electrochemical cell configuration of FIG. 7 is identical to that of FIG. 2 and may be better understood by reference thereto. In various embodiments, fluidic access to channels 82 can be maintained by limiting the thickness of coating layer 86, such that channels 82 are not completely closed off. Even with coating layer 86 being present within channels 82, electrical contact between electrode 10 and bipolar plate 90 can still be maintained at interface 14 to promote electrical communication between adjacent electrochemical cells.

In alternative configurations, the inventors also discovered that the amount of conductive material in the bipolar plate could be significantly lowered to decrease the incidence of parasitic reactions. In particular, the inventors discovered that the conductive material within a bipolar plate can be largely replaced with a dielectric material, with only limited areas of conductive material remaining present to establish electrical conductivity with an electrode and to promote electrical communication between adjacent electrochemical cells. More particularly, the inventors discovered that an effective bipolar plate can be fabricated by positioning a plurality of conductive posts through a block of dielectric material in the shape of a conventional bipolar plate, thereby allowing a contiguous electrically conductive pathway to be established in the half-cell. This bipolar plate configuration is discussed further below in regard to FIG. 8. In some configurations, the channels can be omitted in bipolar plates fabricated substantially from a dielectric material, and the conductive posts can again allow the bipolar plate to maintain sufficient electrical conductivity to function in its intended manner.

Figure 8:
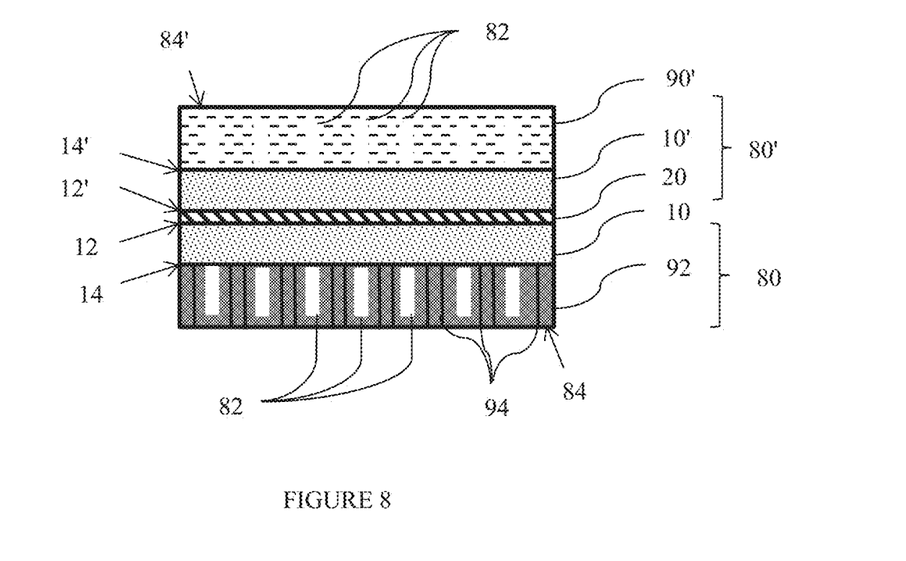
FIG. 8 shows a schematic of an illustrative electrochemical cell configuration containing a dielectric-based bipolar plate with a plurality of conductive posts extending therethrough.

FIG. 8 shows a schematic of an illustrative electrochemical cell configuration containing a dielectric-based bipolar plate with a plurality of conductive posts extending therethrough. In some embodiments, conductive posts 94 can be a conductive wire, whereby a minimal surface area of the wire's conductive material is exposed to an electrolyte solution at interface 14, thereby providing a minimal surface area for parasitic reactions to occur. The number of conductive posts 94 extending through dielectric-based bipolar plate 92 can be chosen to establish satisfactory electrical conductivity while keeping the incidence of parasitic reactions below a given level. Hence, the number of conductive posts 94 depicted in FIG. 8 should not be considered limiting. Moreover, any disposition of conductive posts 94 within dielectric-based bipolar plate layer 92 can be present, and the substantially regular distribution shown in FIG. 8 should not be considered limiting. Other than the presence of dielectric-based bipolar plate 92 and conductive posts 94 in FIG. 8, the electrochemical cell configuration of FIG. 8 is identical to that of FIG. 2 and may be better understood by reference thereto.

As indicated above, the various electrochemical cell configurations described hereinabove can desirably decrease the incidence of parasitic reactions that occur within the electrochemical cell. More particularly, the first electrode and/or the first bipolar plate can have an active area sized such that a ratio of productive reactions to parasitic reactions exceeds 5 when the flow battery is in operation. Higher ratios of productive reactions to parasitic reactions can also be realized. In some embodiments, a ratio of productive reactions to parasitic reactions can be about 10 or above, or about 20 or above, or about 30 or above, or about 40 or above, or about 50 or above, or about 100 or above, or about 200 or above, or about 500 or above, or about 1000 or above. A suitable ratio of productive reactions to parasitic reactions can vary from application to application. Accordingly, the design of a given electrochemical cell can incorporate any number of the features described hereinabove to achieve a given ratio of productive reactions to parasitic reactions. A suitable ratio can be determined for a given application based upon optimizing current efficiency versus cell resistance. For example, the overall active area in a half-cell can be lowered until the resistance increases above a threshold value, and the current efficiency can then be determined for that cell geometry. If the current efficiency is sufficient, that cell configuration can then be used suitably. Stated differently, at least about 95% of the current in the half-cell can result from productive reactions, and at least about 99% can result from productive reactions in some embodiments.

In embodiments employing a dielectric material (i.e., an insulator) to decrease the incidence of parasitic reactions, a wide range of generally non-conductive substances can be used. In some embodiments, the suitable dielectric materials can include plastics (i.e., polymers, including fluorinated polymers), ceramics, and fluorinated hydrocarbons. One particularly suitable fluorinated polymer can include polytetrafluoroethylene. Other suitable polymers include, for example, polyethylene, polypropylene, neoprene, and the like. As used herein, the term "ceramic" will refer to any inorganic, non-metallic material, which can be crystalline, partially crystalline or substantially or fully amorphous. In some embodiments, suitable ceramics include oxides, carbides, nitrides, borides, and the like. Particular examples of illustrative ceramics include, for example, beryllium oxide, barium titanate, boron nitride, silicon carbide, and titanium carbide.

Suitable techniques for incorporating a dielectric material into or onto an electrode or a bipolar plate are not considered to be particularly limited. In some embodiments, the dielectric material can be dissolved in a solvent and applied to an electrode or bipolar plate by spray-on, brush-on, or dip coating techniques. In other embodiments, a ceramic can be deposited by thin-layer deposition techniques such as chemical vapor deposition, atomic layer deposition, and the like. Catalyst layers can be applied in a similar manner in instances where such layers are present.

Electrodes provide for the conveyance of electrical current from an external circuit to a location in an electrochemical cell where electrochemical energy conversion takes place. The electrodes can provide a surface upon which electrochemical reactions, including both productive and non-productive reactions can take place. In some embodiments, the electrodes can include a catalyst. In alternative embodiments, one or more of the electrodes in a flow battery can consist essentially of a catalyst layer. Suitable conductive material for inclusion in an electrode within a flow battery can include, for example, carbon and/or metals such as gold, silver, titanium or platinum. Other suitable conductive materials can include, for example, steel, zinc, tantalum, palladium, tin, nickel, copper, iridium, rhodium, ruthenium, boron nitride, tungsten carbide, boron-doped diamond, and degenerately doped semiconductors. In some embodiments, suitable electrodes can be in the form of a porous sheet containing one or more of the foregoing materials. Suitable electrode thicknesses for various configurations are discussed in more detail hereinabove.

In some embodiments, flow batteries of the present disclosure can include an active material in one or more electrolyte solutions that is a coordination complex. As used herein, the terms "coordination complex" and "coordination compound" will refer to any compound having a metal bound to one or more ligands through a covalent bond. Due to their variable oxidation states, transition metals can be highly desirable for use within the active materials of a flow battery. Cycling between the accessible oxidation states can result in the conversion of chemical energy into electrical energy. Lanthanide metals can be used similarly in this regard in alternative embodiments. Particularly desirable transition metals for inclusion in a flow battery include, for example, Al, Cr, Ti and Fe. For purposes of the present disclosure, Al is to be considered a transition metal. In some embodiments, coordination complexes within a flow battery can include at least one catecholate or substituted catecholate ligand. Sulfonated catecholate ligands can be particularly desirable ligands due to their ability to promote solubility of coordination complexes in which they are present.

Other ligands that can be present in coordination complexes, alone or in combination with one or more catecholate or substituted catecholate ligands, include, for example, ascorbate, citrate, glycolate, a polyol, gluconate, hydroxyalkanoate, acetate, formate, benzoate, malate, maleate, phthalate, sarcosinate, salicylate, oxalate, urea, polyamine, aminophenolate, acetylacetonate, and lactate. Where chemically feasible, it is to be recognized that such ligands can be optionally substituted with at least one group selected from among $C_{1-6}$ alkoxy, $C_{1-6}$ alkyl, $C_{1-6}$ alkenyl, $C_{1-6}$ alkynyl, 5- or 6-membered aryl or heteroaryl groups, a boronic acid or a derivative thereof, a carboxylic acid or a derivative thereof, cyano, halide, hydroxyl, nitro, sulfonate, a sulfonic acid or a derivative thereof, a phosphonate, a phosphonic acid or a derivative thereof, or a glycol, such as polyethylene glycol. Alkanoate includes any of the alpha, beta, and gamma forms of these ligands. Polyamines include, but are not limited to, ethylenediamine, ethylenediamine tetraacetic acid (EDTA), and diethylenetriamine pentaacetic acid (DTPA).

Other examples of ligands can be present include monodentate, bidentate, and/or tridentate ligands. Examples of monodentate ligands that can be present in a coordination complex include, for example, carbonyl or carbon monoxide, nitride, oxo, hydroxo, water, sulfide, thiols, pyridine, pyrazine, and the like. Examples of bidentate ligands that can be present in a coordination complex include, for example, bipyridine, bipyrazine, ethylenediamine, idols (including ethylene glycol), and the like. Examples of tridentate ligands that can be present a coordination complex include, for example, terpyridine, diethylenetriamine, triazacyclononane, tris(hydroxymethyl)aminomethane, and the like.

The active materials in a flow battery can be disposed in an aqueous electrolyte solution in which the active material is dissolved. As used herein, the term "aqueous electrolyte solution" will refer to a homogeneous liquid phase with water as a predominant solvent in which an active material is at least partially solubilized, ideally fully solubilized. This definition encompasses both solutions in water and solutions containing a water-miscible organic solvent as a minority component of an aqueous phase.

Illustrative water-miscible organic solvents that can be present in an aqueous electrolyte solution include, for example, alcohols and glycols, optionally in the presence of one or more surfactants or other components discussed below. In more specific embodiments, an aqueous electrolyte solution can contain at least about 98% water by weight. In other more specific embodiments, an aqueous electrolyte solution can contain at least about 55% water by weight, or at least about 60% water by weight, or at least about 65% water by weight, or at least about 70% water by weight, or at least about 75% water by weight, or at least about 80% water by weight, or at least about 85% water by weight, or at least about 90% water by weight, or at least about 95% water by weight. In some embodiments, an aqueous electrolyte solution can be free of water-miscible organic solvents and consist of water alone as a solvent.

In further embodiments, an aqueous electrolyte solution can include a viscosity modifier, a wetting agent, or any combination thereof. Suitable viscosity modifiers can include, for example, corn starch, corn syrup, gelatin, glycerol, guar gum, pectin, and the like. Other suitable examples will be familiar to one having ordinary skill in the art. Suitable wetting agents can include, for example, various non-ionic surfactants and/or detergents. In some or other embodiments, an aqueous electrolyte solution can further include a glycol or a polyol. Suitable glycols can include, for example, ethylene glycol, diethylene glycol, and polyethylene glycol. Suitable polyols can include, for example, glycerol, mannitol, sorbitol, pentaerythritol, and tris(hydroxymethyl)aminomethane. Inclusion of any of these components in an aqueous electrolyte solution can help promote dissolution of a coordination complex or similar active material and/or reduce viscosity of the aqueous electrolyte solution for conveyance through a flow battery, for example.

In addition to a solvent and a coordination complex as an active material, an aqueous electrolyte solution can also include one or more mobile ions (i.e., an extraneous electrolyte). In some embodiments, suitable mobile ions can include proton, hydronium, or hydroxide. In other various embodiments, mobile ions other than proton, hydronium, or hydroxide can be present, either alone or in combination with proton, hydronium or hydroxide. Such alternative mobile ions can include, for example, alkali metal or alkaline earth metal cations (e.g., $Li^+$, $Na^+$, $Mg^{2+}$, $Ca^{2+}$ and $Sr^{2+}$) and halides (e.g., $F^-$, $Cl^-$, or $Br^-$). Other suitable mobile ions can include, for example, ammonium and tetraalkylammonium ions, chalcogenides, phosphate, hydrogen phosphate, phosphonate, nitrate, sulfate, nitrite, sulfite, perchlorate, tetrafluoroborate, hexafluorophosphate, and any combination thereof. In some embodiments, less than about 50% of the mobile ions can constitute protons, hydronium, or hydroxide. In other various embodiments, less than about 40%, less than about 30%, less than about 20%, less than about 10%, less than about 5%, or less than about 2% of the mobile ions can constitute protons, hydronium, or hydroxide.

Flow batteries can provide sustained charge or discharge cycles of several hour durations. As such, they can be used to smooth energy supply/demand profiles and provide a mechanism for stabilizing intermittent power generation assets (e.g., from renewable energy sources such as solar and wind energy). It should be appreciated, then, that various embodiments of the present disclosure include energy storage applications where such long charge or discharge durations are desirable. For example, in non-limiting examples, the flow batteries of the present disclosure can be connected to an electrical grid to allow renewables integration, peak load shifting, grid firming, baseload power generation and consumption, energy arbitrage, transmission and distribution asset deferral, weak grid support, frequency regulation, or any combination thereof. When not connected to an electrical grid, the flow batteries of the present disclosure can be used as power sources for remote camps, forward operating bases, off-grid telecommunications, remote sensors, the like, and any combination thereof. Further, while the disclosure herein is generally directed to flow batteries, it is to be appreciated that other electrochemical energy storage media can incorporate the electrolyte solutions and coordination complexes described herein, specifically those utilizing stationary electrolyte solutions.

In some embodiments, flow batteries can include: a first chamber containing a negative electrode contacting a first aqueous electrolyte solution; a second chamber containing a positive electrode contacting a second aqueous electrolyte solution, and a separator disposed between the first and second electrolyte solutions. The chambers provide separate reservoirs within the cell, through which the first and/or second electrolyte solutions circulate so as to contact the respective electrodes and the separator. Each chamber and its associated electrode and electrolyte solution define a corresponding half-cell. The separator provides several functions which include, for example, (1) serving as a barrier to mixing of the first and second electrolyte solutions, (2) electrically insulating to reduce or prevent short circuits between the positive and negative electrodes, and (3) to facilitate ion transport between the positive and negative electrolyte chambers, thereby balancing electron transport during charge and discharge cycles. The negative and positive electrodes provide a surface where electrochemical reactions can take place during charge and discharge cycles. During a charge or discharge cycle, electrolyte solutions can be transported from separate storage tanks through the corresponding chambers, as shown in FIG. 1. In a charging cycle, electrical power can be applied to the cell such that the active material contained in the second electrolyte solution undergoes a one or more electron oxidation and the active material in the first electrolyte solution undergoes a one or more electron reduction. Similarly, in a discharge cycle the second active material is reduced and the first active material is oxidized to generate electrical power.

The separator can be a porous membrane in some embodiments and/or an ionomer membrane in other various embodiments. In some embodiments, the separator can be formed from an ionically conductive polymer. Regardless of its type, the separator or membrane can be ionically conductive toward various ions.

Polymer membranes can be anion- or cation-conducting electrolytes. Where described as an "ionomer," the term refers to polymer membrane containing both electrically neutral repeating units and ionized repeating units, where the ionized repeating units are pendant and covalently bonded to the polymer backbone. In general, the fraction of ionized units can range from about 1 mole percent to about 90 mole percent. For example, in some embodiments; the content of ionized units is less than about 15 mole percent; and in other embodiments, the ionic content is higher, such as greater than about 80 mole percent. In still other embodiments, the ionic content is defined by an intermediate range, for example, in a range of about 15 to about 80 mole percent. Ionized repeating units in an ionomer can include anionic functional groups such as sulfonate, carboxylate, and the like. These functional groups can be charge balanced by, mono-, di-, or higher-valent cations, such as alkali or alkaline earth metals. Ionomers can also include polymer compositions containing attached or embedded quaternary ammonium, sulfonium, phosphazenium, and guanidinium residues or salts. Suitable examples will be familiar to one having ordinary skill in the art.

In some embodiments, polymers useful as a separator can include highly fluorinated or perfluorinated polymer backbones. Certain polymers useful in the present disclosure can include copolymers of tetrafluoroethylene and one or more fluorinated, acid-functional co-monomers, which are commercially available as NAFION™ perfluorinated polymer electrolytes from DuPont. Other useful perfluorinated polymers can include copolymers of tetrafluoroethylene and $FSO_2$—$CF_2CF_2CF_2CF_2$—O—$CF$=$CF_2$, FLEMION™ and SELEMION™.

Additionally, substantially non-fluorinated membranes that are modified with sulfonic acid groups (or cation exchanged sulfonate groups) can also be used. Such membranes can include those with substantially aromatic backbones such as, for example, polystyrene, polyphenylene, biphenyl sulfone (BPSH), or thermoplastics such as polyetherketones and polyethersulfones.

Battery-separator style porous membranes, can also be used as the separator. Because they contain no inherent ionic conduction capabilities, such membranes are typically impregnated with additives in order to function. These membranes typically contain a mixture of a polymer and inorganic filler, and open porosity. Suitable polymers can include, for example, high density polyethylene, polypropylene, polyvinylidene difluoride (PVDF), or polytetrafluoroethylene (PTFE). Suitable inorganic fillers can include silicon carbide matrix material, titanium dioxide, silicon dioxide, zinc phosphide, and ceria.

Separators can also be formed from polyesters, polyetherketones, poly(vinyl chloride), vinyl polymers, and substituted vinyl polymers. These can be used alone or in combination with any previously described polymer.

Porous separators are non-conductive membranes which allow charge transfer between two electrodes via open channels filled with electrolyte. The permeability increases the probability of active materials passing through the separator from one electrode to another and causing cross-contamination and/or reduction in cell energy efficiency. The degree of this cross-contamination can depend on, among other features, the size (the effective diameter and channel length), and character (hydrophobicity/hydrophilicity) of the pores, the nature of the electrolyte, and the degree of wetting between the pores and the electrolyte.

The pore size distribution of a porous separator is generally sufficient to substantially prevent the crossover of active materials between the two electrolyte solutions. Suitable porous membranes can have an average pore size distribution of between about 0.001 nm and 20 micrometers, more typically between about 0.001 nm and 100 nm. The size distribution of the pores in the porous membrane can be substantial. In other words, a porous membrane can contain a first plurality of pores with a very small diameter (approximately less than 1 nm) and a second plurality of pores with a very large diameter (approximately greater than 10 micrometers). The larger pore sizes can lead to a higher amount of active material crossover. The ability for a porous membrane to substantially prevent the crossover of active materials can depend on the relative difference in size between the average pore size and the active material. For example, when the active material is a metal center in a coordination complex, the average diameter of the coordination complex can be about 50% greater than the average pore size of the porous membrane. On the other hand, if a porous membrane has substantially uniform pore sizes, the average diameter of the coordination complex can be about 20% larger than the average pore size of the porous membrane. Likewise, the average diameter of a coordination complex is increased when it is further coordinated with at least one water molecule. The diameter of a coordination complex of at least one water molecule is generally considered to be the hydrodynamic diameter. In such embodiments, the hydrodynamic diameter is generally at least about 35% greater than the average pore size. When the average pore size is substantially uniform, the hydrodynamic radius can be about 10% greater than the average pore size.

In some embodiments, the separator can also include reinforcement materials for greater stability. Suitable reinforcement materials can include nylon, cotton, polyesters, crystalline silica, crystalline titania, amorphous silica, amorphous titania, rubber, asbestos, wood or any combination thereof.

Separators within the flow batteries of the present disclosure can have a membrane thickness of less than about 500 micrometers, or less than about 300 micrometers, or less than about 250 micrometers, or less than about 200 micrometers, or less than about 100 micrometers, or less than about 75 micrometers, or less than about 50 micrometers, or less than about 30 micrometers, or less than about 25 micrometers, or less than about 20 micrometers, or less than about 15 micrometers, or less than about 10 micrometers. Suitable separators can include those in which the flow battery is capable of operating with a current efficiency of greater than about 85% with a current density of 100 mA/cm$^2$ when the separator has a thickness of 100 micrometers. In further embodiments, the flow battery is capable of operating at a current efficiency of greater than 99.5% when the separator has a thickness of less than about 50 micrometers, a current efficiency of greater than 99% when the separator has a thickness of less than about 25 micrometers, and a current efficiency of greater than 98% when the separator has a thickness of less than about 10 micrometers. Accordingly, suitable separators include those in which the flow battery is capable of operating at a voltage efficiency of greater than 60% with a current density of 100 mA/cm$^2$. In further embodiments, suitable separators can include those in which the flow battery is capable of operating at a voltage efficiency of greater than 70%, greater than 80% or even greater than 90%.

The diffusion rate of the first and second active materials through the separator can be less than about $1\times10^{-5}$ mol cm$^{-2}$ day$^{-1}$, or less than about $1\times10^{-6}$ mol cm$^{-2}$ day$^{-1}$, or less than about $1\times10^{-7}$ mol cm$^{-2}$ day$^{-1}$, or less than about $1\times10^{-9}$ mol cm$^{-2}$ day$^{-1}$, or less than about $1\times10^{-11}$ mol cm$^{-2}$ day$^{-1}$, or less than about $1\times10^{-13}$ mol cm$^{-2}$ day$^{-1}$, or less than about $1\times10^{-15}$ mol cm$^{-2}$ day$^{-1}$.

The flow batteries can also include an external electrical circuit in electrical communication with the first and second electrodes. The circuit can charge and discharge the flow battery during operation. Reference to the sign of the net ionic charge of the first, second, or both active materials relates to the sign of the net ionic charge in both oxidized and reduced forms of the redox active materials under the conditions of the operating flow battery. Further exemplary embodiments of a flow battery provide that (a) the first active material has an associated net positive or negative charge and is capable of providing an oxidized or reduced form over an electric potential in a range of the negative operating potential of the system, such that the resulting oxidized or reduced form of the first active material has the same charge sign (positive or negative) as the first active material and the ionomer membrane also has a net ionic charge of the same sign; and (b) the second active material has an associated net positive or negative charge and is capable of providing an oxidized or reduced form over an electric potential in a range of the positive operating potential of the system, such that the resulting oxidized or reduced form of the second active material has the same charge sign (positive or negative sign) as the second active material and the ionomer membrane also has aunt ionic charge of the same sign; or both (a) and (b). The matching charges of the first and/or second active materials and the ionomer membrane can provide a high selectivity. More specifically, charge matching can provide less than about 3%, less than about 2%, less than about 1%, less than about 0.5%, less than about 0.2%, or less than about 0.1% of the molar flux of ions passing through the ionomer membrane as being attributable to the first or second active material. The term "molar flux of ions" will refer to the amount of ions passing through the ionomer membrane, balancing the charge associated with the flow of external electricity/electrons. That is, the flow battery is capable of operating or operates with the substantial exclusion of the active materials by the ionomer membrane, and such exclusion can be promoted through charge matching.

Flow batteries incorporating of the present disclosure can have one or more of the following operating characteristics: (a) where, during the operation of the flow battery, the first or second active materials comprise less than about 3% of the molar flux of ions passing through the ionomer membrane; (b) where the round trip current efficiency is greater than about 70%, greater than about 80%, or greater than about 90%; (c) where the round trip current efficiency is greater than about 90%; (d) where the sign of the net ionic charge of the first, second, or both active materials is the same in both oxidized and reduced forms of the active materials and matches that of the ionomer membrane; (e) where the ionomer membrane has a thickness of less than about 100 µm, less than about 75 µm, less than about 50 µm, or less than about 250 µm; (f) where the flow battery is capable of operating at a current density of greater than about 100 mA/cm² with a round trip voltage efficiency of greater than about 60%; and (g) where the energy density of the electrolyte solutions is greater than about 10 Wh/L, greater than about 20 Wh/L, or greater than about 30 Wh/L.

In some cases, a user may desire to provide higher charge or discharge voltages than available from a single electrochemical cell. In such cases, several battery cells can be connected in series such that the voltage of each cell is additive. This forms a bipolar stack, also referred to as an electrochemical stack. As discussed herein, a bipolar plate can be employed to connect adjacent electrochemical cells in a bipolar stack, which allows for electron transport to take place but prevents fluid or gas transport between adjacent cells. The positive electrode compartments and negative electrode compartments of individual cells can be fluidically connected via common positive and negative fluid manifolds in the bipolar stack. In this way, individual cells can be stacked in series to yield a voltage appropriate for DC applications or conversion to AC applications.

In additional embodiments, the cells, bipolar stacks, or batteries can be incorporated into larger enemy storage systems, suitably including piping and controls useful for operation of these large units. Piping, control, and other equipment suitable for such systems are known in the art, and can include, for example, piping and pumps in fluid communication with the respective chambers for moving electrolyte solutions into and out of the respective chambers and storage tanks for holding charged and discharged electrolytes. The cells, cell stacks, and batteries of this disclosure can also include an operation management system. The operation management system can be any suitable controller device, such as a computer or microprocessor, and can contain logic circuitry that sets operation of any of the various valves, pumps, circulation loops, and the like.

In more specific embodiments, a flow battery system can include a flow battery (including a cell or cell stack) storage tanks and piping for containing and transporting the electrolyte solutions; control hardware and software (which may include safety systems); and a power conditioning unit. The flow battery cell stack accomplishes the conversion of charging and discharging cycles and determines the peak power. The storage tanks contain the positive and negative active materials, such as the coordination complexes disclosed herein, and the tank volume determines the quantity of energy stored in the system. The control software, hardware, and optional safety systems suitably include sensors, mitigation equipment and other electronic/hardware controls and safeguards to ensure safe, autonomous, and efficient operation of the flow battery system. A power conditioning unit can be used at the front end of the energy storage system to convert incoming and outgoing power to a voltage and current that is optimal for the energy storage system or the application. For the example of an energy storage system connected to an electrical grid, in a charging cycle the power conditioning unit can convert incoming AC electricity into DC electricity at an appropriate voltage and current for the cell stack. In a discharging cycle, the stack produces DC electrical power and the power conditioning unit converts it to AC electrical power at the appropriate voltage and frequency for grid applications.

Where not otherwise defined hereinabove or understood by one having ordinary skill in the art, the definitions in the following paragraphs will be applicable to the present disclosure.

As used herein, the term "energy density" will refer to the amount of energy that can be stored, per unit volume, in the active materials. Energy density refers to the theoretical energy density of energy storage and can be calculated by Equation 1:

$$\text{Energy density} = (26.8 \text{ A-h/mol}) \times OCV \times [e^-] \quad (1)$$

where OCV is the open circuit potential at 50% state of charge, (26.8 A-h/mol) is Faraday's constant, and $[e^-]$ is the concentration of electrons stored in the active material at 99% state of charge. In the case that the active materials largely are an atomic or molecular species for both the positive and negative electrolyte, $[e^-]$ can be calculated by Equation 2 as:

$$[e^-] = [\text{active materials}] \times N/2 \quad (2)$$

where [active materials] is the molar concentration of the active material in either the negative or positive electrolyte, whichever is lower, and N is the number of electrons transferred per molecule of active material. The related term "charge density" will refer to the total amount of charge that each electrolyte contains. For a given electrolyte, the charge density can be calculated by Equation 3

$$\text{Charge density} = (26.8 \text{ A-h/mol}) \times [\text{active material}] \times N \quad (3)$$

where [active material] and N are as defined above.

As used herein, the term "current density" will refer to the total current passed in an electrochemical cell divided by the geometric area of the electrodes of the cell and is commonly reported in units of mA/cm².

As used herein, the term "current efficiency" ($I_{eff}$) can be described as the ratio of the total charge produced upon discharge of a cell to the total charge passed during charging. The current efficiency can be a function of the state of charge of the flow battery. In some non-limiting embodiments, the current efficiency can be evaluated over a state of charge range of about 35% to about 60%.

As used herein, the term "voltage efficiency" can be described as the ratio of the observed electrode potential, at a given current density, to the half-cell potential for that electrode (×100%). Voltage efficiencies can be described for a battery charging step, a discharging step, or a "round trip voltage efficiency." The round trip voltage efficiency ($V_{eff,RT}$) at a given current density can be calculated from the cell voltage at discharge ($V_{discharge}$) and the voltage at charge ($V_{charge}$) using equation 4:

$$V_{eff,RT} = V_{discharge}/V_{charge} \times 100\% \quad (4)$$

As used herein, the terms "negative electrode" and "positive electrode" are electrodes defined with respect to one another, such that the negative electrode operates or is designed or intended to operate at a potential more negative than the positive electrode (and vice versa), independent of the actual potentials at which they operate, in both charging and discharging cycles. The negative electrode may or may not actually operate or be designed or intended to operate at a negative potential relative to a reversible hydrogen electrode. The negative electrode is associated with a first electrolyte solution and the positive electrode is associated with a second electrolyte solution, as described herein. The electrolyte solutions associated with the negative and positive electrodes may be described as negolytes and posolytes, respectively.

Accordingly, in some embodiments of present disclosure, flow batteries can include a first half-cell containing a first electrode, a second half-cell containing a second electrode, a separator disposed between the first half-cell and the second half-cell, a first bipolar plate overlaying and contacting the first electrode, and a second bipolar plate overlaying and contacting the second electrode. The first electrode and the second electrode overlay and contact opposing faces of the separator. A portion of the first electrode or the first bipolar plate contains a dielectric material, but such that the first electrode and the first bipolar plate collectively define a contiguous electrically conductive pathway within the first half-cell. The contact between the first electrode and the first bipolar plate can be direct or indirect, as discussed above.

In various embodiments, the first electrode has an active area sized such that a ratio of productive reactions to parasitic reactions exceeds about 5 when the flow battery is in operation. In other various embodiments, the first bipolar plate has an active area sized such that a ratio of productive reactions to parasitic reactions exceeds about 10 when the flow battery is in operation. In more particular embodiments, the ratio of productive reactions to parasitic reactions can be about 15 or above, or about 20 or above, or about 30 or above, or about 40 or above, or about 50 or above, or about 100 or above, or about 200 or above, or about 500 or above, or about 1000 or above.

In some embodiments, the dielectric material can decrease the amount of active area in the first electrode that is available to promote parasitic reactions. In alternative embodiments, a first electrode having a thickness of about 100 microns or less can be used, such that substantially the entirety of the first electrode is in proximity to the separator, thereby promoting productive reactions and decreasing an incidence of parasitic reactions.

Accordingly, in some embodiments, flow batteries of the present disclosure can include a first half-cell containing a first electrode, a second half-cell containing a second electrode, and a separator disposed between the first half-cell and the second half-cell. The first electrode and the second electrode overlay and contact opposing faces of the separator. At least the first electrode has a thickness of about 100 microns or less. In some embodiments, the first electrode has an active area sized such that a ratio of productive reactions to parasitic reactions exceeds about 10 when the flow battery is in operation. In further embodiments, the flow batteries can include a first bipolar plate overlaying and contacting the first electrode and a second bipolar plate overlaying and contacting the second electrode. Again, the contact can be direct or indirect.

In some embodiments, an internal portion of the first electrode or an internal portion of the first bipolar plate is infused with a dielectric material. When an internal portion of the first electrode is infused with a dielectric material, the dielectric material is not in contact with the separator of the first bipolar plate. When an internal portion of the first bipolar plate is infused with a dielectric material, the dielectric material is not in contact with the first electrode. In more particular embodiments, the first bipolar plate can include a plurality of channels that are at least partially coated with the dielectric material. In some embodiments, the channels can be totally filled (occluded) with the dielectric material.

In alternative embodiments, the first bipolar plate can be formed from a dielectric material, and a plurality of conductive posts can extend through the dielectric material and contact the first electrode.

In some embodiments, the first electrode can contain a conductive mesh having a conductive medium deposited on a first side of the conductive mesh and a dielectric material deposited on a second side of the conductive mesh. The conductive medium is in contact with the separator, and the dielectric medium is in contact with the first bipolar plate. A plurality of conductive posts extend through the dielectric material from the conductive mesh to the first bipolar plate.

In some embodiments, the first electrode can be the negative electrode of an electrochemical cell. In other embodiments, the first electrode can be the positive electrode of an electrochemical cell. The various cell configurations disclosed herein can be particularly advantageous for decreasing the incidence of parasitic reactions at the negative electrode and its associated bipolar plate.

In some embodiments, the first electrode can constitute a catalyst layer coated upon the separator. In more particular embodiments, the catalyst layer can be discontinuous or have a defined porosity, so as not to compromise the permeability of the separator. In some embodiments, the catalyst layer can contain a plurality of carbon nanotubes. In further embodiments, a metal catalyst can be dispersed within the carbon nanotubes.

Associated methods for mitigating the incidence of parasitic reactions are also implicitly provided in the present disclosure. The methods include forming an electrochemical cell containing: a first half-cell containing a first electrode, a second half-cell containing a second electrode, a separator disposed between the first half-cell and the second half-cell, a first bipolar plate overlaying and contacting the first electrode, and a second bipolar plate overlaying and contacting the second electrode; and incorporating a dielectric material in a portion of the first electrode or the first bipolar plate, but such that the first electrode and the first bipolar plate collectively define a contiguous electrically conductive pathway within the first half-cell. The first electrode and the second electrode overlay and contact opposing faces of the separator. In some embodiments, the dielectric material can be incorporated in the first electrode or the first bipolar plate by spraying a solution of the dielectric material onto the first electrode or the first bipolar plate.

Other associated methods for mitigating the incidence of parasitic reactions can include: providing a separator, depositing a catalyst layer upon at least a first side of the separator, and forming a flow battery having the catalyst layer in contact with a bipolar plate in at least a first half-cell of the flow battery.

Still other associated methods for mitigating the incidence of parasitic reactions can include: forming a flow battery having a first electrode in contact with a separator, wherein the first electrode has a thickness of about 100 microns or less.

Although the disclosure has been described with reference to the disclosed embodiments, those skilled in the art will readily appreciate that these are only illustrative of the disclosure. It should be understood that various modifications can be made without departing from the spirit of the disclosure. The disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description.

What is claimed is the following:

1. A flow battery comprising:
   (a) first half-cell (80) containing a porous first electrode (10) having an internal porous surface;
   (b) a second half-cell (80') containing a second electrode (10');
   (c) separator (20) disposed between the first half-cell and the second half-cell;
   wherein the porous first electrode and the second electrode overlay and contact opposing faces of the separator at a first interface (12) and a second interface (12'), respectively;
   (d) a first bipolar plate (90) overlaying and contacting the first electrode at a third interface (14); and
   (e) a second bipolar plate (90') overlaying and contacting the second electrode at a fourth interface (14');
   wherein a portion of the porous internal surface of the first electrode is coated with a dielectric material (100), such that the dielectric material (100) coating precludes contact of the first electrolyte solution with the portion of the coated internal porous surface, but does not impede flow of the first electrolyte solution through the porous first electrode (10), while the first electrode and the first bipolar plate collectively define a contiguous electrically conductive pathway within the first half-cell
   and.

2. The flow battery of claim 1, wherein the dielectric material (100) is not in contact with the separator (20) or the first bipolar plate (90).

3. The flow battery of claim 1, wherein the first bipolar plate (90) comprises a plurality of channels (82) that are at least partially coated with a dielectric coating layer (86).

4. The flow battery of claim 3, wherein the first bipolar plate (90) comprises a plurality of conductive posts (94) extending through the dielectric material (100) and contacting the first electrode (10).

5. The flow battery of claim 1, wherein the first electrode (10) comprises a conductive mesh (15) having a conductive medium (16) deposited on a first side of the conductive mesh (15) and the dielectric material (17) deposited on a second side of the conductive mesh (15), the conductive medium (16) being in contact with the separator (20) at interface (12) and the dielectric material (100) being in contact with the first bipolar plate (90) at interface 14; and wherein a plurality of conductive posts (18) extend through the dielectric material (100) from the conductive mesh (15) to the first bipolar plate (90).

6. The flow battery of claim 1, wherein the first electrode (10) is a negative electrode.

7. A flow battery comprising:
   (a) first half-cell (80) containing a porous first electrode (10) having an internal porous surface;
   (b) a second half-cell (80') containing a second electrode (10');
   (c) a separator (20) disposed between the first half-cell and the second half-cell;
   wherein the porous first electrode and the second electrode overlay and contact opposing faces of the separator at a first interface (12) and a second interface (12'), respectively;
   wherein the first electrode comprises a catalyst layer (11) coated upon the separator; and
   wherein the first electrode has a thickness of about 100 microns or less.

8. The flow battery of claim 7, wherein the first electrode (10) has an active area sized such that a ratio of productive reactions to parasitic reactions exceeds about 10 when the flow battery is in operation.

9. The flow battery of claim 7, wherein the catalyst layer (11) comprises a plurality of carbon nanotubes.

10. The flow battery of claim 7, further comprising:
    a first bipolar plate (90) overlaying and contacting the first electrode (10) and a second bipolar plate (90') overlaying and contacting the second electrode (10').

11. The flow battery of claim 7, wherein the first electrode (10) is a negative electrode.

12. A method comprising:
    forming an electrochemical cell comprising:
    a first half-cell (80) containing a porous first electrode (10) having an internal porous surface;
    a second half-cell (80') containing a second electrode (10');
    a separator (20) disposed between the first half-cell and the second half-cell;
    wherein the porous first electrode and the second electrode overlay and contact opposing faces of the separator at a first interface (12) and a second interface (12'), respectively; and
    a first bipolar plate (90) overlaying and contacting the first electrode at a third interface (14); and
    a second bipolar plate (90') overlaying and contacting the second electrode at a fourth interface (14');
    coating a dielectric material (100) in an internal portion of the first electrode, such that the dielectric material coating precludes contact of the first electrolyte solution with the portion of the coated internal porous surface, but does not impede flow of the first electrolyte solution through the porous first electrode, while the first electrode (10) and the first bipolar plate (90) collectively define a contiguous electrically conductive pathway within the first half-cell;
    wherein the dielectric material (100) in the first bipolar plate is not in contact with the first electrode (10), and the dielectric material (100) in the first electrode (10) is not in contact with the separator (20) or the first bipolar plate (90).

13. The method of claim 12, wherein coating the dielectric material (100) comprises infusing the dielectric material (100) into the internal portion of the first electrode (10).

14. The method of claim 12, wherein a portion of the first bipolar plate (90) contains dielectric material, wherein incorporating the dielectric material (100) comprises infusing the dielectric material (100) into an internal portion of the first bipolar plate (90).

15. The method of claim 14, wherein dielectric material (100) is infused into a plurality of channels (82) within the first bipolar plate (90), the channels being coated with the dielectric material.

16. The method of claim 12, wherein the dielectric material (100) is incorporated by spraying a solution of the dielectric material (100) onto the first electrode (10).

17. The method of claim 12, wherein the first bipolar plate (90) comprises a plurality of conductive posts (94) extending through the dielectric material (100), the conductive posts (94) contacting the first electrode (10).

18. The method of claim 12, wherein the first electrode (10) comprises a conductive mesh(15) having a conductive medium (16) deposited on a first side of the conductive mesh (15) and the dielectric material (17) deposited on a second side of the conductive mesh (15), the conductive medium (16) being in contact with the separator (20) and the dielectric material (100) being in contact with the first bipolar plate (90);
wherein a plurality of conductive posts (18) extend through the dielectric material (100) from the conductive mesh (15) to the first bipolar plate (90).

19. A method comprising:
providing a separator(20);
depositing a catalyst layer (11) upon at least a first face of the separator (20); and
forming a flow battery having the catalyst layer (11) in contact with a bipolar plate in at least a first half-cell of the flow battery,
wherein the bipolar plate (90) comprises channels (82) or pores and an internal portion of the bipolar plate (90) is infused with a dielectric material (100) and
wherein the dielectric material (100) is not in contact with the separator (20).

20. The method of claim 19, wherein the catalyst layer (11) comprises a plurality of carbon nanotubes.

21. The flow battery of claim 1, wherein the second electrode (10') is also porous and has an internal porous surface, at least a portion of which is coated with a dielectric coating material, such that the dielectric coating material precludes contact of the second electrolyte solution with the portion of the coated internal porous surface, but does not impede flow of the second electrolyte solution through the porous second electrode, while the second electrode and the second bipolar plate (90') collectively define a contiguous electrically conductive pathway within the second half-cell (80').

* * * * *